Jan. 24, 1961 ZEN-ITI KIYASU ET AL 2,969,497

PARAMETRICALLY EXCITED RESONATOR

Filed Jan. 15, 1957 6 Sheets-Sheet 1

Jan. 24, 1961 ZEN-ITI KIYASU ET AL 2,969,497

PARAMETRICALLY EXCITED RESONATOR

Filed Jan. 15, 1957 6 Sheets-Sheet 2

PARAMETRICALLY EXCITED RESONATOR

Filed Jan. 15, 1957 6 Sheets-Sheet 5

United States Patent Office 2,969,497

Patented Jan. 24, 1961

2,969,497

PARAMETRICALLY EXCITED RESONATOR

Zen-iti Kiyasu, Kazuo Husimi, and Kaoru Yamanaka, Tokyo, Japan, assignors to Nippon Telegraph and Telephone Public Corporation, Tokyo, Japan Filed Jan. 15, 1957, Ser. No. 637,058

Claims priority, application Japan Jan. 16, 1956

13 Claims. (Cl. 321—69)

This invention relates to a so-called parametrically excited resonator employing semi-conductor elements. A parametrically excited resonator including a non-linear reactor can generate an oscillation with a half of the exciting frequency which is about the double of the natural one.

The phase of oscillation of such a parametrically excited resonator or a parametron (said resonating circuit is specially called as a "parametron" hereinafter), is either O radian or $\pi$ radians differing relatively in 180 degrees. Therefore when an input signal having a small amplitude and a half of the exciting frequency is previously impressed upon the parametron, the phase of oscillation is synchronized into either one of O radian and $\pi$ radians according to the phase of the signal.

Using the function described above, a parametron can be used to constitute an electronic computer or various electrical communication apparatuses and a logical circuit. In conventional parametrons, the non-linear reactor is a coil having a ferro-magnetic core such as made of ferrite or a ferro-electric condenser such as made of barium titanate. The rate of parameter variation is small in general, and becomes smaller as the applied field intensity decreased. Therefore, a considerable large exciting power is required for the parametron, at least some ten miliwatt per one element. Thereby the cost of a power for the system is considerably high. Furthermore, as a ferro-magnetic and a ferro-electric materials have hysteresis characteristics, the energy consumed as a hysteresis loss heat up the non-linear element during the excitation, which causes the operation unstable and makes it impossible to obtain large power output. Moreover, as a ferro-magnetic and a ferro-electric material has domain structure, the operational frequencies is limited by the time required for the switching of domains, and it is very difficult to operate in high speed.

The object of this invention is to provide a parametrically excited resonator or a parametron in which the disadvantages described above are avoided by employing semi-conductors as a non-linear element.

Figure 1:
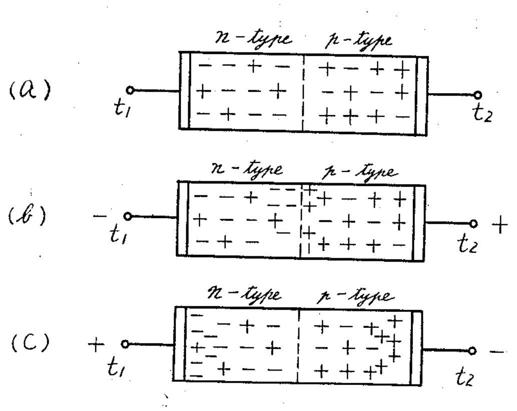
Figure 2:
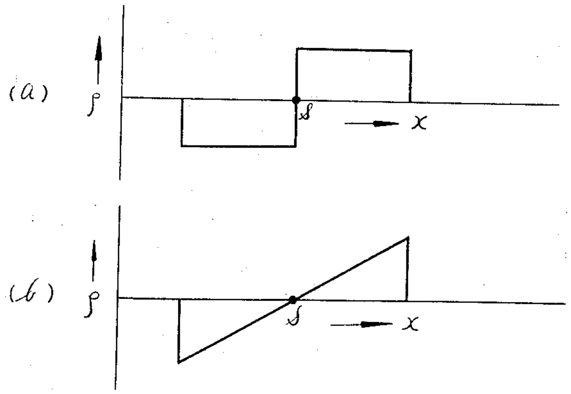
Figure 3:
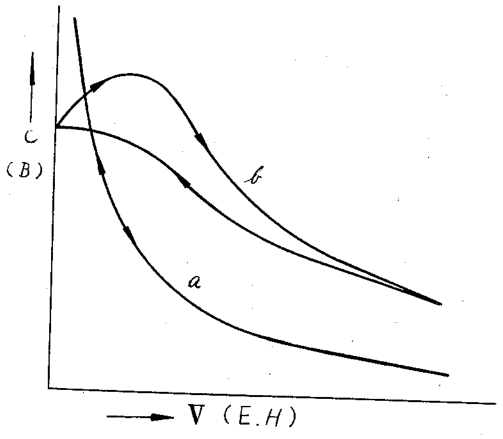

This invention will now be described with reference to the accompanying drawings, in which:

Figs. 1*a*, 1*b* and 1*c* are diagrams showing the operation principle of a junction type semi-conductor, Figs. 2*a* and 2*b* are graphs showing the distribution of electric charges corresponding to Figs. 1*b* and 1*c*, Fig. 3 is a graph showing the non-linear characteristic curves of a condenser made of semi-conductor and a body of ferro-magnetic or ferro-electric material.

Figure 4:
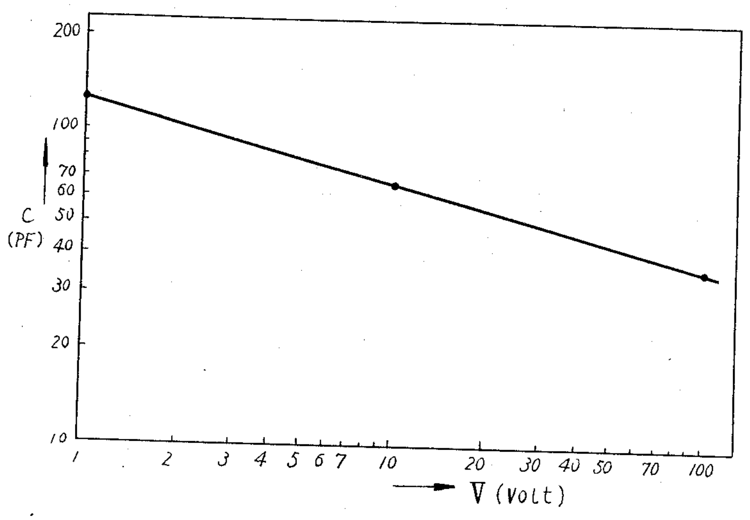
Figure 5:
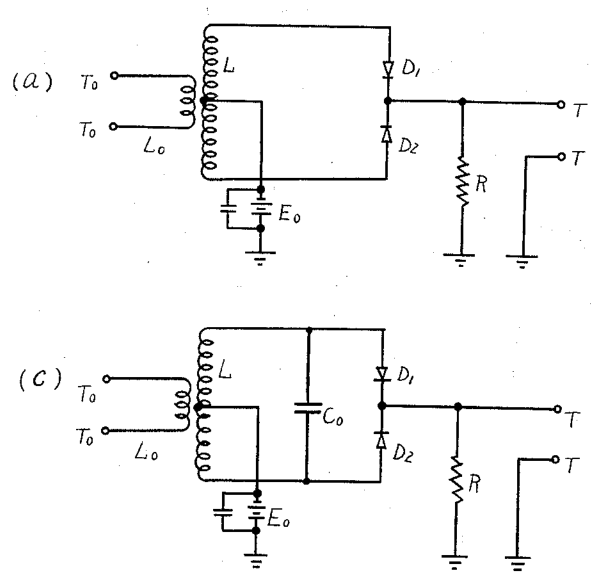
Figure 6:
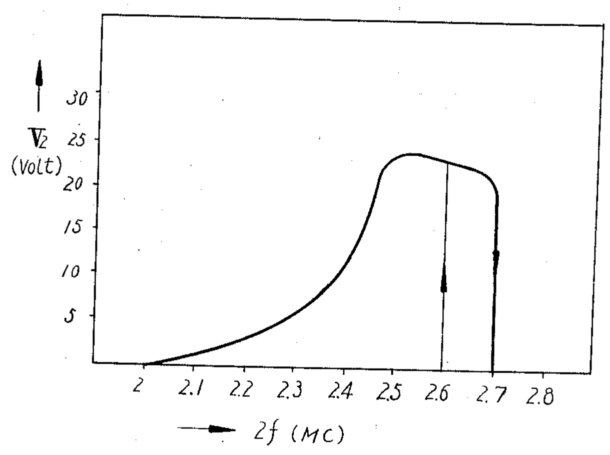
Figure 8:
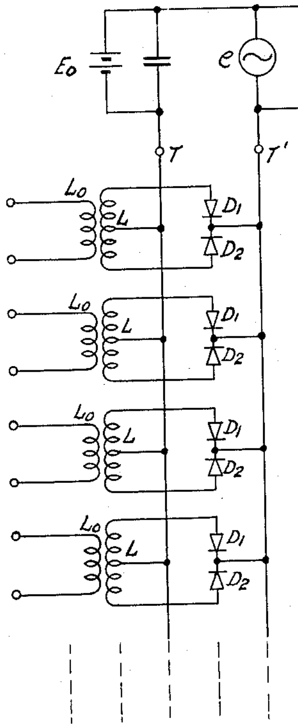
Figure 7:
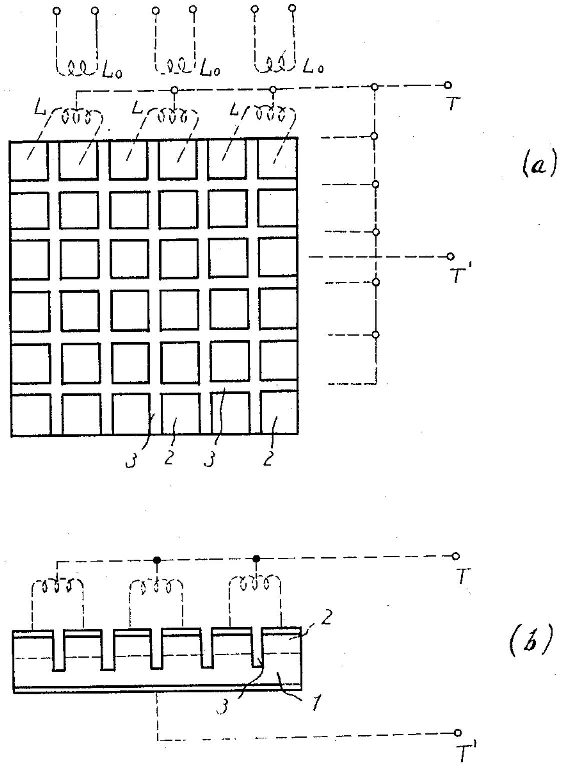
Figure 9:
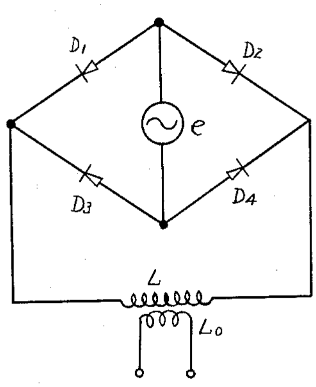
Figure 10:
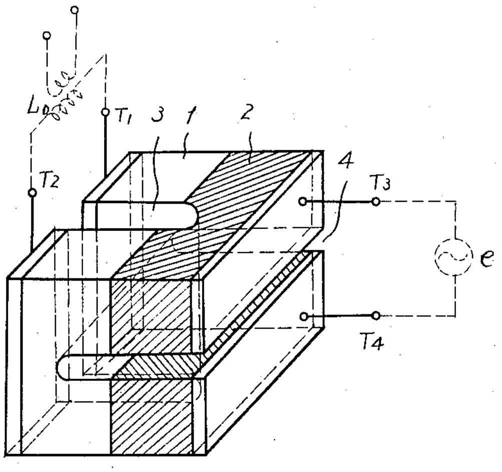

Fig. 4 is a graph showing a practically measured variation of capacity of a junction type semi-conductor, Figs. 5*a* to 5*d* are circuit diagrams showing an embodiment according to this invention, Figs. 6*a* and 6*b* are graphs showing the practically measured oscillation characteristic curve of the circuit shown in Fig. 5, Figs. 7*a* and 7*b* show the front elevation and side elevation representing the construction of the semi-conductor used in the embodiment of this invention, Fig. 8 shows a circuit diagram according to this invention employing the semi-conductor shown in Fig. 7, Fig. 9 shows another embodiment according to this invention, and Fig. 10 is a sketch showing the construction of a semi-conductor suited for the use in Fig. 9.

In the accompanying drawings, Figs. 1*a*, 1*b* and 1*c* are typical diagrams of a junction type semi-conductor having a n type semi-conductor and a p type semi-conductor, wherein an electric voltage is to be applied across the terminals $t_1$ and $t_2$. When an electric voltage is not applied across terminals $t_1$ and $t_2$ as shown in Fig. 1*a*, a portion of carriers or electrons shown with negative signs within the n type semi-conductor are expanded into p type semi-conductor, and a portion of carriers or the holes shown with positive signs in p type semi-conductor are expanded into the n type semi-conductor, generating a contact potential difference at the boundary layer. As the electric field at said boundary layer has a direction to prevent the further diffusion of the carriers, the carriers are at the condition of balance, not generating an electric current. But when a negative voltage is applied to the terminal $t_1$ of the n type semi-conductor and a positive voltage is applied to the terminal $t_2$ of the p type semi-conductor as shown in Fig. 1*b*, electrons with negative signs are moved toward to p type semi-conductor and holes with positive signs are moved toward n type semi-conductor, generating a flow of current through the boundary layer whereby to produce a conducting state. Furthermore when a positive voltage is applied to n type semi-conductor and a negative voltage is applied to p type semi-conductor as shown in Fig. 1*c*, electrons are moved toward left side and holes are moved toward right side in the drawing, but the carriers are not moved over the boundary layer, not causing the flow of electric current and a cut off state is provided. Therefore the junction type semi-conductor at this state act as an electro-static condenser.

As the electro-static capacity of a junction type semi-conductor at the cut off state is determined by the distributed density of the holes in the p type semi-conductor and the electrons in the n type semi-conductor, the capacity is varied according to the condition of the electric voltage applied across the terminals $t_1$ and $t_2$, representing a non-linear characteristic.

Let us assume that an electron charge having a density $\rho$ in a material having a dielectric constant $\epsilon$ and the electrical potential at the respective point is V, a Poisson's equation described below will be established, $$\nabla^2 V = \frac{4\pi\rho}{\epsilon} \quad (1)$$

Therefore when the electron charge density $\rho$ relating a distance $x$ from a position $s$ on the boundary layer of an alloy junction type semi-conductor as shown in Fig. 2*a*, that is to say, when the distribution of donors or acceptors in semi-conductor is uniform, the electric voltage V between the terminals $t_1$ and $t_2$ of Fig. 1 can be obtained by the following equation which is the integration of Equation 1

$$V = \frac{4\pi\rho}{\Sigma} \times \frac{d^2}{2} \quad (2)$$

wherein $d$ shows the depth of the barrier layer.

In grown or diffusion type semi-conductor, the distribution of donors or acceptors are progressively increased with the distance from the boundary layer, but when it is assumed that the electric charge $\epsilon$ is proportional to the distance $x$ from the boundary portion $s$ at this condition as shown in Fig. 2*b*, the voltage between the terminals $t_1$ and $t_2$ is expressed by $$V=\frac{4\pi}{\varepsilon}\times\frac{\alpha d^3}{6} \quad (3)$$

wherein $\alpha$ is a proportional constant given by $\rho=\alpha d$. Therefore the electro-static capacity of a junction type semi-conductor at the cut off state is given by, as from Equation 2 or Equation 3

$$C=\left(\frac{2\epsilon\rho}{4\pi}\right)^{1/2}\times\frac{1}{V^{1/2}} \quad (4)$$

or $$C=\left(\frac{3\epsilon}{4\pi}\right)^{2/3}\left(\frac{\alpha}{2}\right)^{1/3}\times\frac{1}{V^{1/3}} \quad (5)$$

From the above stated description, it is clear that the value of the electro-static capacity of a junction is inversely proportional to ½ or ⅓ power of the impressed voltage corresponding to the types of junction, but the electro-static capacity is increased with the decrease of applied voltage in both cases, the rate of variation become fairly large when the applied voltage is small, and it can not represent any hysteresis characteristics against the variation of the applied voltage.

The curve *a* in Fig. 3 represents an example of the relation between the electro-static capacity C and the applied voltage V, and when it is compared curve *a* with *b* representing a hysteresis characteristic of the permeability $\mu$ of a ferro-magnetic material and a magnetic field H or the relation between a capacity C of a ferro-electric material and an electric field E, it is clear that curve has a large rate of variation of parameter especially at a small voltage. Fig. 4 shows a practically measured example of a relation between the impressed voltage V in volts and the electro-static capacity C in pico-farads.

Figures 5B, 5D, 6:
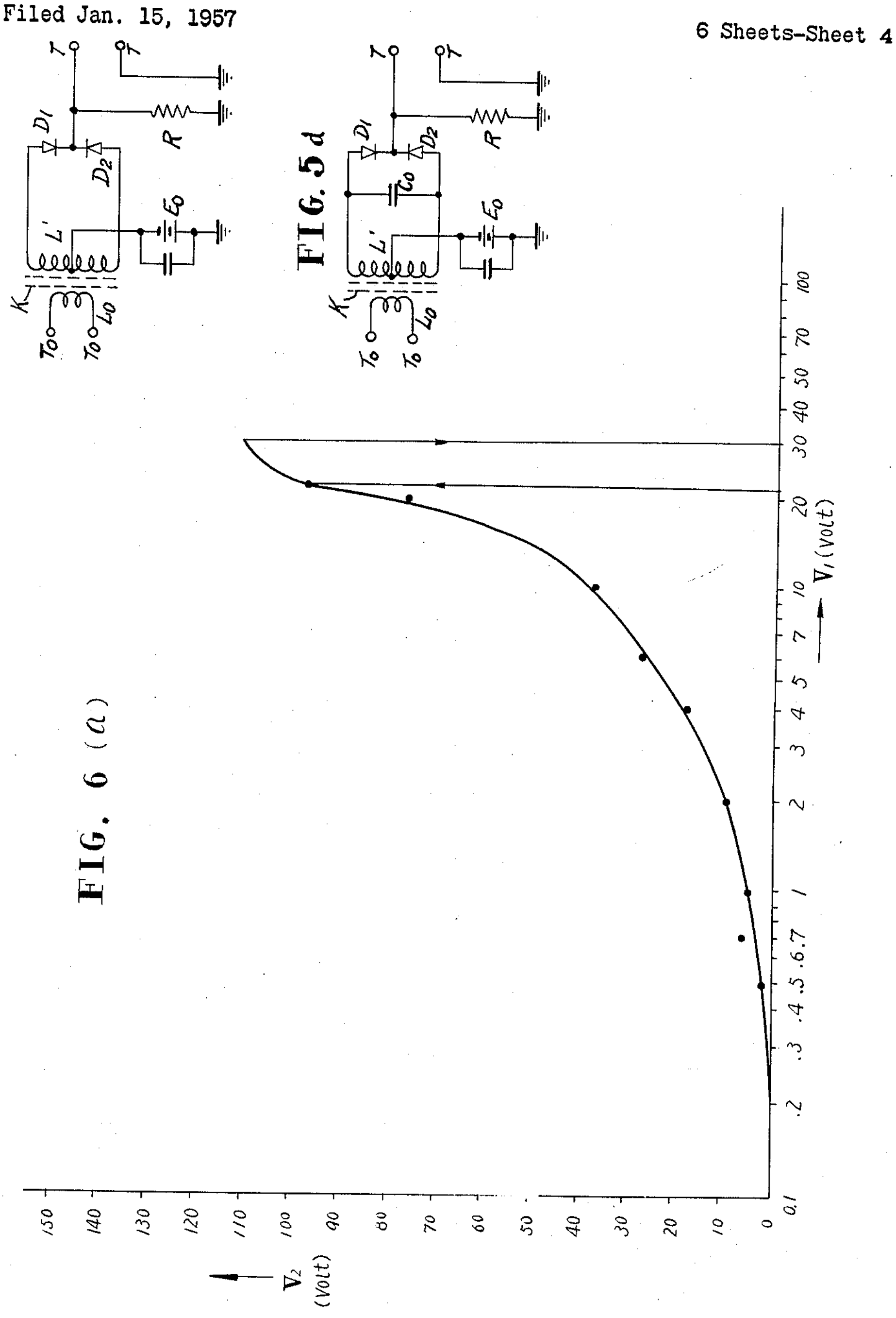

Figs. 5*a* to 5*d* represent circuit diagrams embodying this invention wherein a resonant circuit having a resonant frequency *f* comprising a serial connection of a pair of junction type semi-conductors $D_1$ and $D_2$ stated above in opposite polarization, an air cored coil L or a coil L′ having a solid core K (Figs. 5*b* and 5*d*) made of a material such as ferrite, distributed capacities of them as shown in Figs. 5*a* and 5*b*, and a condenser $C_0$, if necessary, as shown in Figs. 5*c* and 5*d* being provided. When the semi-conductors $D_1$ and $D_2$ are maintained at a cut-off state by inserting a D.C. bias voltage source $E_0$ between a neutral point of the coil L or coil L′ and the coupling point of the junction type semi-conductors $D_1$ and $D_2$ through a resistor R, and an exciting voltage of frequency 2*f* is applied across the terminals T, an oscillation having a frequency *f* can be obtained in the resonant circuit, the electro-static capacities of the semi-conductors $D_1$ and $D_2$ receiving a parametric variation. The oscillation output can be taken out from the terminals $T_0$ by means of an output winding $L_0$ coupling with the coil L or L′. But as the excitation terminals T are connected between the neutral points of the resonant circuit, both the leakage of the output to the exciting circuit and the leakage of the excitation to the output circuit can be prevented.

As shown in the example described above, this invention relates to a means in which an excitation is applied upon a resonant circuit in which one or more semi-conductors are employed as non-linear capacitance elements in order to generate a parametric oscillation. Because a non-linear capacitor has a large rate of parameter variation at a condition in which the impressed voltage is smaller, one can readily generate an oscillation with a very small power such as the order of some hundred micro-watts. Simultaneously, when the oscillation voltage is increased, an amplitude of oscillation is automatically limited. Furthermore as the condenser according to this invention has no hysteresis characteristics as is represented in a ferro-magnetic material or a ferro-electric material, the exciting power is not consumed in a hysteresis loss resulting a very small heat generation even though in a high power parametron, thereby stabilizing the oscillation and a small sized device can be obtained. Moreover, though ferro-magnetic or a ferro-electric material operates due to the switching of the domains, this capacitor operates by means of the displacements of holes or electrons, so that a parametron employing this invention operates high frequency range, thereby can be expected a very high speed operation.

Fig. 6*a* shows a practically measured example of the relation between the exciting voltage $V_1$ in volts and the parametric oscillation voltage $V_2$ in volts in which a junction type semi-conductor made of germanium and the circuit in Fig. 5*a* are employed in order to generate an oscillation of 1 mc. by the excitation of 2 mc. and Fig. 6*b* shows the practically measured oscillation voltage characteristics wherein the frequency 2*f* mc. of the 5 volts of the exciting wave is varied similarly in the example shown in Fig. 6*a*. That is to say, an oscillation can be generated at an exciting voltage of 0.2 volt and a stabilized oscillation can be obtained until the voltage is increased to the order of 20 volts of exciting voltage. But when the exciting voltage is further increased, the oscillation voltage is also increased to the Zener's voltage of it, stopping the oscillation rapidly. The consumed power of the exciting voltage at 0.2 volt is a very small value of 200 micro-watts.

When a logical circuit of an electronic computer and other communication apparatus is composed of parametron, a considerable large quantity of parametron elements of the same type are used. Therefore, as a plan is shown in Fig. 7*a* and a side elevation is shown in Fig. 7*b*, when a flat plane body is constituted by making a junction of a n type semi-conductor (or a p type semi-conductor) 1 and a p type semi-conductor ( or a n type semi-conductor) 2, and a plurality of longitudinal and lateral grooves 3 on the surface of a semi-conductor 2 to the depth reaching to the junction surface of the other semi-conductor 1, a group of junction type semi-conductors obtained by dividing said semi-conductor 2 into a plurality of rectangular pieces, can be produced. By employing this group of junction type semi-conductors, a plurality of parametron elements can be composed very readily and in a very small volume. When two of rectangular semi-conductors 2 are selected to constitute a pair, a coil L being connected between them, and an exciting wave source *e* and a D.C. bias voltage source $E_0$ being connected between a terminal T connected to neutral points of respective coils and a terminal T′ of the semi-conductor 1 as shown by the broken line connections in said figure, the oscillation output of respective parametron element composed of a coil L and a pair of junction type semi-conductors is taken out from the output winding $L_0$. Fig. 8 shows an example of the circuit constituted by a group of parametron elements thus obtained.

When four semi-conductor elements $D_1$, $D_2$, $D_3$ and $D_4$ are connected to constitute an electrical bridge and a coil L and an exciting wave source *e* and respectively inserted between opposite vertexes as shown in Fig. 9, balanced type parametron element is constituted. Fig. 10 shows a sketch of a construction of a semi-conductor to obtain such a circuit shown in Fig. 9 in a simple way. When a cubic body made by the junction of a n type (or p type) semi-conductor 1 and a p type (or a n type) semi-conductor 2 is provided with grooves 3 and 4 from two sides of said cubic body in two directions perpendicular to each other, a coil L or an exciting wave source *e* are respectively connected between the semi-conductor terminals $T_1$ and $T_2$; and $T_3$ and $T_4$ of the respective surfaces of said divided cubical body. In this condition, a group of semi-conductors constituting a plurality of parametron elements can be employed as a body as shown in Fig. 7.

The parametrically excited resonator according to this invention employs condensers made by semi-conductors such as germanium, silicon, selenium, or copper oxide as the non-linear elements as described hereinabove, whereby a parametric oscillation can readily be produced by a very small exciting power of the order of hundred microwatts or less. But as they have not an effect due to heat consumption by hysteresis loss or the like, the device can be constituted in a very small size and a high speed function can be obtained by the oscillation of a high frequency. Therefore when the device according to this invention is used as to construct a logical circuit of an electronic computer, a frequency divider, or the like for a communication device, a high ability device operating accurately by a very small consuming power or a very small input power.

As a wide modification can be made in the construction described in the specification and shown in the accompanying drawings, these described and shown hereinbefore can be considered to be several examples of this invention and not a limiting sense.

What we claim is:

1. A resonator comprising input means for the introduction of an excitation signal, output means for the transmission of an output signal, a resonant circuit having a resonant frequency coupled between said input and output means, said resonant circuit including an inductance and a semi-conductor device, bias means providing a bias voltage having an amplitude greater than that of the excitation signal, said bias means being coupled to said resonant circuit for biasing the semi-conductor device to cause the same to operate as a non-linear capacitor, and a signal source coupled to said input means and generating a signal having a frequency which is about twice the resonant frequency of the resonant circuit.

2. A resonator as claimed in claim 1 wherein the semi-conductor device is of the pn type.

3. A resonator as claimed in claim 1 wherein the semi-conductor device is rectifier.

4. A resonator as claimed in claim 1 wherein the bias means is a source of D.-C. potential.

5. A resonator as claimed in claim 1 wherein the bias means is a time constant circuit.

6. A resonator as claimed in claim 1 wherein said resonant circuit comprises two semi-conductor devices and said inductor having a center tap, said biasing means being coupled to said center tap and said semi-conductor devices being serially disposed across said inductor.

7. A resonator as claimed in claim 1 wherein said input means comprises a transformer having a secondary winding with a center tap coupled to said bias means.

8. A resonator as claimed in claim 1 wherein said resonant circuit comprises four semi-conductor devices in bridge arrangement, a pair of opposite junctions of the bridge being coupled to said inductor to prevent the leakage of the exciting wave to said output circuit.

9. A resonator as claimed in claim 1 comprising a switching device coupled to said resonant circuit for rendering the output signal intermittent.

10. A resonator as claimed in claim 1 comprising a control coupled to said bias means for controlling the operation of the resonant circuit in order to generate the oscillation therein by switching the exciting wave.

11. A resonator as claimed in claim 1 comprising an inductor in said resonant circuit and a control operatively associated with the inductor for controlling the resonant circuit.

12. A resonator as claimed in claim 1 wherein said semi-conductor device is constituted by a block of semi-conductor material defining a plurality of grooves in perpendicular arrangement.

13. A resonator as claimed in claim 1 comprising two semi-conductor devices intermittently employed for the transmission of signals.

References Cited in the file of this patent

UNITED STATES PATENTS

| | | |
|---|---|---|
| 2,182,377 | Guanella | Dec. 5, 1939 |
| 2,830,251 | Tiley | Apr. 8, 1958 |

FOREIGN PATENTS

| | | |
|---|---|---|
| 440,954 | Italy | Oct. 22, 1948 |